(12) United States Patent
Zugen et al.

(10) Patent No.: US 11,626,743 B2
(45) Date of Patent: Apr. 11, 2023

(54) BATTERY TOOL CONNECTION INTERFACE

(71) Applicant: HUSQVARNA AB, Huskvarna (SE)

(72) Inventors: Ni Zugen, Suzhou (CN); Yang Ming, Suzhou (CN); Zhang Wu, Suzhou (CN)

(73) Assignee: HUSQVARNA AB, Huskvarna (SE)

( * ) Notice: Subject to any disclaimer, the term of this patent is extended or adjusted under 35 U.S.C. 154(b) by 404 days.

(21) Appl. No.: 16/770,132

(22) PCT Filed: Dec. 6, 2017

(86) PCT No.: PCT/CN2017/114867
§ 371 (c)(1),
(2) Date: Jun. 5, 2020

(87) PCT Pub. No.: WO2019/109275
PCT Pub. Date: Jun. 13, 2019

(65) Prior Publication Data
US 2020/0389035 A1    Dec. 10, 2020

(51) Int. Cl.
*H02J 7/00* (2006.01)
*B25F 5/02* (2006.01)
*H01M 50/572* (2021.01)

(52) U.S. Cl.
CPC .............. *H02J 7/0031* (2013.01); *B25F 5/02* (2013.01); *H01M 50/572* (2021.01); *H02J 7/0047* (2013.01); *H01M 2220/30* (2013.01)

(58) Field of Classification Search
USPC ......................................................... 429/61
See application file for complete search history.

(56) References Cited

U.S. PATENT DOCUMENTS

| | | | |
|---|---|---|---|
| 5,401,592 A * | 3/1995 | Gilpin | ............... H01M 50/213 429/97 |
| 2002/0067080 A1* | 6/2002 | Neumann | ............... H02J 7/02 307/150 |

(Continued)

FOREIGN PATENT DOCUMENTS

CN           105591419 A           5/2016

OTHER PUBLICATIONS

International Search Report and Written Opinion for International Application No. PCT/CN2017/114867 dated Sep. 7, 2018.

(Continued)

*Primary Examiner* — Mohammed Alam
(74) *Attorney, Agent, or Firm* — Burr & Forman LLP (57) ABSTRACT

A battery-powered tool (200) may include a first tool-side electrical contact (251), a battery detection switch (220), a tool load (300), and a load connection switching device (210). The load connection switching device (210) may be configured to make an electrical connection between the first tool-side electrical contact (251) and the tool load (300) in response to a state change of the battery detection switch (220). The tool (200) may define engagement positions with the battery (110). In the first engagement position, a first battery-side electrical contact (111) is electrically coupled to a first tool-side electrical contact (251), and the battery detection switch (220) is not physically engaged. In the second engagement position, the first battery-side electrical contact (111) is electrically coupled to the tool-side electrical contact (251), and the battery detection switch (220) is physically engaged to cause a state change of the battery detection switch (220).

12 Claims, 9 Drawing Sheets

(56) References Cited

U.S. PATENT DOCUMENTS

| | | | | |
|---|---|---|---|---|
| 2004/0160212 A1* | 8/2004 | Mastaler | ............... | B25F 5/02 |
| | | | | 320/115 |
| 2008/0018303 A1* | 1/2008 | Scheucher | ........... | H02J 7/0013 |
| | | | | 320/128 |
| 2010/0320969 A1* | 12/2010 | Sakakibara | ........... | H01M 50/20 |
| | | | | 429/61 |
| 2020/0212505 A1* | 7/2020 | Nakano | ............... | H01M 10/48 |
| 2020/0389035 A1* | 12/2020 | Zuqen | ...................... | B25F 5/02 |

OTHER PUBLICATIONS

International Preliminary Report on Patentability for International Application No. PCT/CN2017/114867 dated Jun. 9, 2020.

* cited by examiner

BATTERY TOOL CONNECTION INTERFACE

TECHNICAL FIELD

The example embodiments described herein relate generally to electrically powered devices. More particularly, the example embodiments relate to a battery and tool interface for electrically powered devices.

BACKGROUND

As battery technology continues to evolve more and more devices are being redesigned to run solely on electricity provided by batteries. Machines, such as tools, that were most commonly driven by petroleum engines are now being powered by batteries and electric motors. Since many batteries that are used for powering tools are often rechargeable, many tools offer the capability of removing a discharged battery and installing a charged battery to continue operation of the tool in a relatively uninterrupted fashion. In some instances, when a battery is installed or removed from a tool, electric current may attempt passing through the battery contacts before a connection is made, which may create arcing that may damage the contacts of the battery or the tool. Accordingly, it would be beneficial to be able to install or remove a battery without the risk of arcing.

BRIEF SUMMARY OF SOME EXAMPLES

As described herein, a system comprising a battery and a battery-powered tool is provided. The battery-powered tool may comprise a first tool-side electrical contact, a battery detection switch, a tool load, and a load connection switching device. The load connection switching device may be configured to make an electrical connection between the first tool-side electrical contact and the tool load in response to a state change of the battery detection switch. The battery may be configured to hold an electrical charge for powering the battery-powered tool. The battery may comprise a first battery-side electrical contact, and a battery detection switch engaging member. The battery and the battery-powered tool may be configured to define engagement positions comprising a first engagement position and a second engagement position. In this regard, the battery and the battery-powered tool may be configured to be disposed in the first engagement position prior to being disposed in the second engagement position during installation of the battery with the battery-powered tool.

The battery and the battery-powered tool may be further configured to be disposed in the second engagement position prior to being disposed in the first engagement position during removal of the battery from the battery-powered tool. Further, in the first engagement position, the first battery-side electrical contact is electrically coupled to the first tool-side electrical contact, and the battery detection switch is not physically engaged by the battery detection switch engaging member. In the second engagement position, the first battery-side electrical contact is electrically coupled to the tool-side electrical contact, and the battery detection switch is physically engaged with the battery detection switch engaging member to cause a state change of the battery detection switch.

Further, as described herein a battery-powered tool is provided. The battery-powered tool may comprise a first tool-side electrical contact, a battery detection switch, a tool load, and a load connection switching device. The load connection switching device may be configured to make an electrical connection between the first tool-side electrical contact and the tool load in response to a state change of battery detection switch. The battery and the battery-powered tool may be configured to define engagement positions comprising a first engagement position and a second engagement position. In this regard, the battery and the battery-powered tool may be configured to be disposed in the first engagement position prior to being disposed in the second engagement position during installation of the battery with the battery-powered tool. The battery and the battery-powered tool may be further configured to be disposed in the second engagement position prior to being disposed in the first engagement position during removal of the battery from the battery-powered tool. In the first engagement position, a first battery-side electrical contact is electrically coupled to a first tool-side electrical contact, and the battery detection switch is not physically engaged by the battery. In the second engagement position, the first battery-side electrical contact is electrically coupled to the tool-side electrical contact, and the battery detection switch is physically engaged with the battery to cause a state change of the battery detection switch.

Additionally, as described herein an example method for installing a battery in a battery-powered tool is provided. The example method may comprise electrically coupling a first battery-side electrical contact of the battery with a first tool-side electrical contact of the battery-powered tool. The example method may further comprise, in response to continued movement of the battery relative to the battery-powered tool and after electrically coupling the first battery-side electrical contact with the first tool-side electrical contact, physically engaging the battery detection switch with the battery to cause a state change of the battery detection switch. The example method may further comprise, in response to the state change of the battery detection switch, operating a load connection switching device to electrically couple the first battery-side electrical contact with a tool load.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

According to some example embodiments, a battery-powered tool and an associated battery are provided, in some embodiments as a system, where the battery provides electric power to the tool for operation. To avoid arcing and provide for a more predictable introduction of electric power to the tool, a load connection switching device, such as a relay may be utilized. The load connection switching device may be configured to close a circuit and electrically connect the battery to the tool load, after the contacts of the battery have electrically coupled to contacts of the tool. To do so, a battery detection switch may be employed that controls the load connection switching device in a manner that causes the load connection switching device to close the circuit and electrically connect the battery to the tool load circuitry upon physical actuation of the battery detection switch. Because of the positioning of the battery detection switch, physical engagement with the battery, during installation, may not occur until after the electric contacts of the battery are already electrically coupled to the electrical contacts of the tool. Similarly, during removal of the battery, the load connection switching device may open the circuit to the load prior to contacts being physically separated. Because the load connection switching device may cause an open circuit to the tool load, no current may be present between the battery and tool contacts when the contacts are physically engaging or disengaging, thereby avoiding arcing between the contacts.

Figure 1:
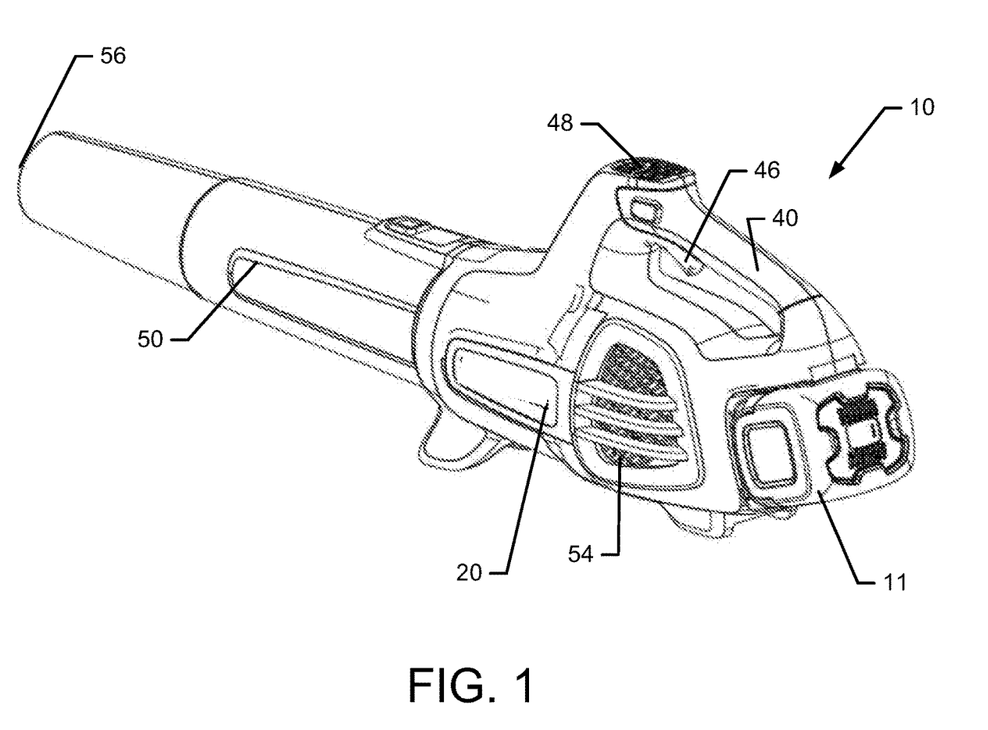
FIG. 1 shows an example battery-powered tool in accordance with an example embodiment.

FIG. 1 illustrates an example tool according to some example embodiments. The example tool is a blower 10. Note that blower 10 is merely provided as an example of a tool that may benefit from the employment of example embodiments and that other example tools may similarly benefit. In this regard, the example tool may be any type of battery-powered lawn or garden care power tool including, for example, blowers, grass trimmers, hedge trimmers, chain saws, mowers, or the like.

FIG. 1 provides a perspective side view of a blower 10 in accordance with an example embodiment. In this regard, FIG. 1 illustrates the blower 10 with a battery 11 installed. The blower 10 may include a housing 20 inside which various components of the blower 10 may be housed. For example, the housing 20 may include therein a power unit (e.g., an electric motor) for providing the driving force to move air through the blower 10 via a fan assembly that is powered by the power unit. The power unit, which may be a component of the electric tool load to the battery 11, may, in turn, receive power from the battery 11 when the battery 11 is installed in the blower 10. In some embodiments, the power unit may comprise a three phase electric motor (or DC motor) that is operated under the control of a control unit or control circuitry, which may also be a component of the electric tool load on the battery 11, and may be housed in the housing 20. According to some example embodiments, the control unit or control circuitry may be active and drawing current from the battery 11, whenever the battery 11 is installed and even when the blower 10 is not being operated. As such, the control unit or control circuitry may be an example of a constant load on the battery 11, as opposed to and intermittent load (e.g., the electric motor).

The housing 20 may be formed of plastic, composite materials, metals or any other desirable materials. In an example embodiment, the housing 20 may be formed of two or more molded pieces that can be fit together. In some cases, the molded pieces may form half-shells (e.g., right and left half-shells) that can be affixed to each other via welding, adhesives, snap fittings, fixing members (e.g., screws), and/or the like. When molded pieces are fit together, they may form a seam at the location of joining between the molded pieces.

In some embodiments, the control unit may be housed in its own portion of the housing 20 above or otherwise proximate to the location of the electric motor and/or fan assembly. The portion of the housing 20 in which the control unit is housed may be referred to as a control unit housing portion, and the control unit housing portion may be an integral part of a half-shell (as described above) or may be a separate housing portion that is joined to other housing portions. The control unit housing portion may be disposed proximate to a portion of the housing 20 near which a handle 40 of the blower 10 is provided (e.g., forward of the handle 40).

In an example embodiment, the handle 40 may include a trigger 46 that may be operated by a finger of the operator while the operator holds the handle 40. Actuation of the trigger 146 may cause power from the battery 11 or other electric power source to be selectively applied to the electric motor to turn the electric motor based on control provided by the control unit. In some cases, the control unit may include interlocks, protective functions, or other control mechanisms that may sense various conditions of the blower 10 via sensors, switches, or other mechanisms in order to selectively control the application of power to the electric motor based on indications of user intent (e.g., via actuation of the trigger 46) and/or determinations regarding the state of the blower 10 as provided by the sensors, switches or other mechanisms.

It should be appreciated that although FIG. 1 shows an example in which the trigger 46 is used for selective powering of the motor, other example embodiments may employ a selector, switch, button or other such operative member in order to selectively control operation of the motor. Thus, for example, on/off, speed control or other operable functions for controlling the motor may be performed using an operative member of any desirable form, and the trigger 46 is just one example. Moreover, in some cases, a human machine interface (HMI) 48 may be provided at, for example, a portion of the handle 40 (or at another location on the blower 10) to interface with the control unit and provide a user interface via which the user may provide inputs to control various ones of the interlocks, protective functions or other control mechanisms of the blower 10.

The blower 10 may further include a blower tube 50 that is attached to the housing 20 (or is a part of the housing 20) and through which air may be expelled during operation of the blower 10. Given that the operator typically holds the blower 10 by the handle 40 and the remainder of the blower 10 is suspended below the handle 40 with the outlet 56 aimed in front of the operator, the handle 40 is generally considered to be at a top portion of the blower 10 and the outlet 56 is at the front, while the inlet portion 54 is considered to be nearer to a rear end of the blower 10.

Having described an example tool, FIGS. 2-5 illustrate an example functional circuit diagram of a battery connection system 100 that would be beneficial to the operation of the an example tool 200 as described herein. The example battery connection system 100 may comprise a battery 110 (e.g. battery 11) and a tool 200 (e.g., blower 10). In this regard, the tool 200 may comprise the battery receptacle 250 and the tool load 300. The battery receptacle 250 may include tool-side electrical contacts 251, 252, the battery detection switch 220, and a load connection switching device 210.

Battery 110 may include one or more battery cells having any type of chemistry (e.g., nickel-cadmium, lithium-ion, etc.). The battery 110 may include terminals with connection connecting or coupling the battery 110 to the battery receptacle 250. In this regard, the battery 110 may have at least two electrical contacts, e.g., first battery-side electrical contact 111 and second battery-side electrical contact 112. Each of the contacts 111, 112 may be electrically coupled to a positive or negative terminals of the battery 110. Further, the battery 110 may include a battery detection switch engaging member 113. The battery detection switch engaging member 113 may be any physical feature of the battery 110 or a housing of the battery 110 that engages with the battery detection switch 220 to cause the battery detection switch 220 to actuate and change state (e.g., open to closed or closed to open). The battery detection switch engaging member 113 may, according to some example embodiments, be a protrusion, a ramp, or other physical feature configured to align with the battery detection switch 220 of the tool 200 to actuate and change state of the battery detection switch 220.

The tool-side electrical contacts 251, 252 may be configured to align with and electrically couple with the battery-side electrical contacts 111, 112 as further described below. According to some example embodiments, the tool-side electrical contacts 251, 252 (or the battery-side electrical contacts 111, 112, or both sets of electrical contacts) may be elongated such that the battery-side electrical contacts 111, 112 may be electrically coupled to the tool-side electrical contacts 251, 252 while still permitting continued physical movement of the battery 110 towards the battery detection switch 220 and maintaining the electrical coupling. As such, the elongated contacts may permit the battery 110 to be electrically coupled to the battery receptacle 250 in positions where the battery has not yet engaged the battery detection switch 220 and in positions where the battery 110 has engaged the battery detection switch 220.

Further, the tool-side electrical contacts 251, 252 may be electrically connected across the tool load 300 with the load switch 215 of the load connection switching device 210 being in series. The tool-side electrical contacts 251, 252 may also be electrically connected across a switch controller 216 of the load connection switching device 210 with the battery detection switch 220 being in series.

The battery detection switch 220 may be any type of electrical switching device that may mechanically or physically actuate and responsively change electrical states (e.g., open or closed) in response to a physical engagement. In this regard, according to some example embodiments, the battery detection switch 220 may be a push button switch, a lever switch, a leaf switch, or the like. According to some example embodiments, mechanical or physical actuation of the battery detection switch 220 may occur in response to engagement with the battery detection switch engaging member 113.

The load connection switching device 210 may be any type of device the includes a controllable switch, which includes any device capable of controlling a current path. The controllable switch of the load connection switching device 210 may be the load switch 215, which may be rated for full load of the tool (e.g., full current that can be drawn by the tool load 300). The load switch 215 may be controlled by a switch controller 216 to cause the load switch 215 to operate (e.g., open or close). The switch controller 216 may be embodied in a number of ways. For example, the switch controller 216 may be an inductor that generates a magnetic field that, when energized, causes actuation of the load switch 215. In this regard, the load connection switching device 210 may be an electronic relay. In other example embodiments, the switch controller 216 may be a transistor or a portion of a transistor that controls the flow of current through the load switch 215 to the tool load 300.

The tool load 300 may represent all or a portion of the full load of the tool. The tool load 300 may include some component that is constant load. Constant load may be the load associated with control circuitry or safety features that are active and drawing current, even when the tool is not in operational use, but the battery 110 is installed. The tool load 300 may, in some example embodiments, include intermittent load. Intermittent load may be the type of load that draws current when the tool is being operated. For example, the electric motor may be considered intermittent load because the electric motor may only run when, for example, a user pulls trigger 46 of the blower 10. Note that constant loads may attempt to draw current immediately upon insertion of a battery and may be drawing current even when the battery is attempting to be removed. As such, constant loads can often be a cause of arcing on the battery contacts in the absence of protective measures, such as those described herein. With that said, intermittent loads can also create issues if, for example, the trigger 46 is pulled while the battery 11 is attempting to be removed thereby adding (and possibly substantially adding) to the current that may be drawn at that time across the contacts of the battery.

Figure 2:
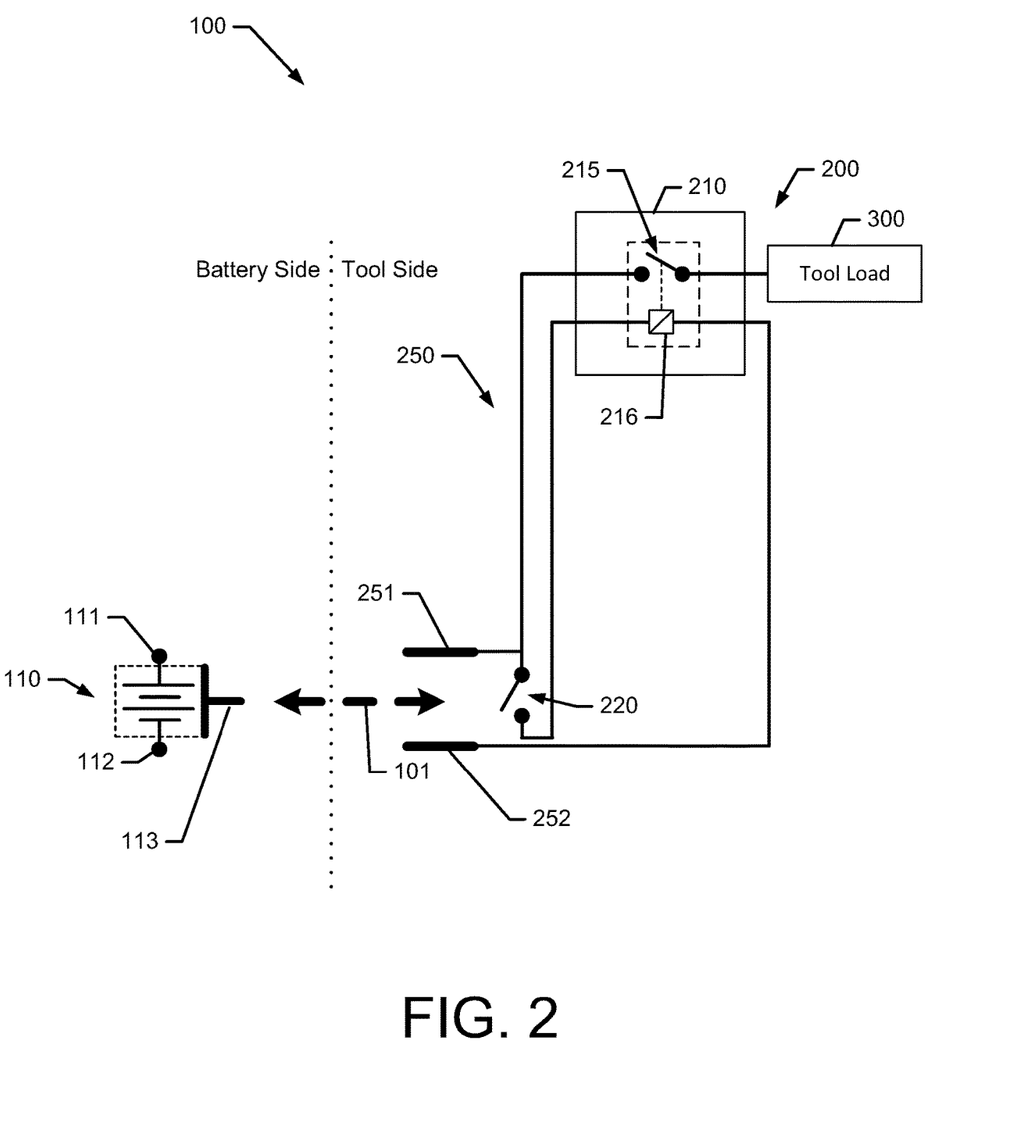
FIG. 2 shows an example functional schematic diagram of a battery connection system with a battery disengaged in accordance with an example embodiment.

Having described various components of the battery connection system 100, the following describes the general operation of the battery connection system 100 during and installation and removal of battery with reference to FIGS. 2-5. FIG. 2 provides a general view of the battery connection system 100 with arrow 101 indicating that the battery 110 can be moved towards the tool-side electrical contacts 251, 252 during a battery installation action and away from the tool-side electrical contacts 251, 252 during a battery removal action.

Figure 3:
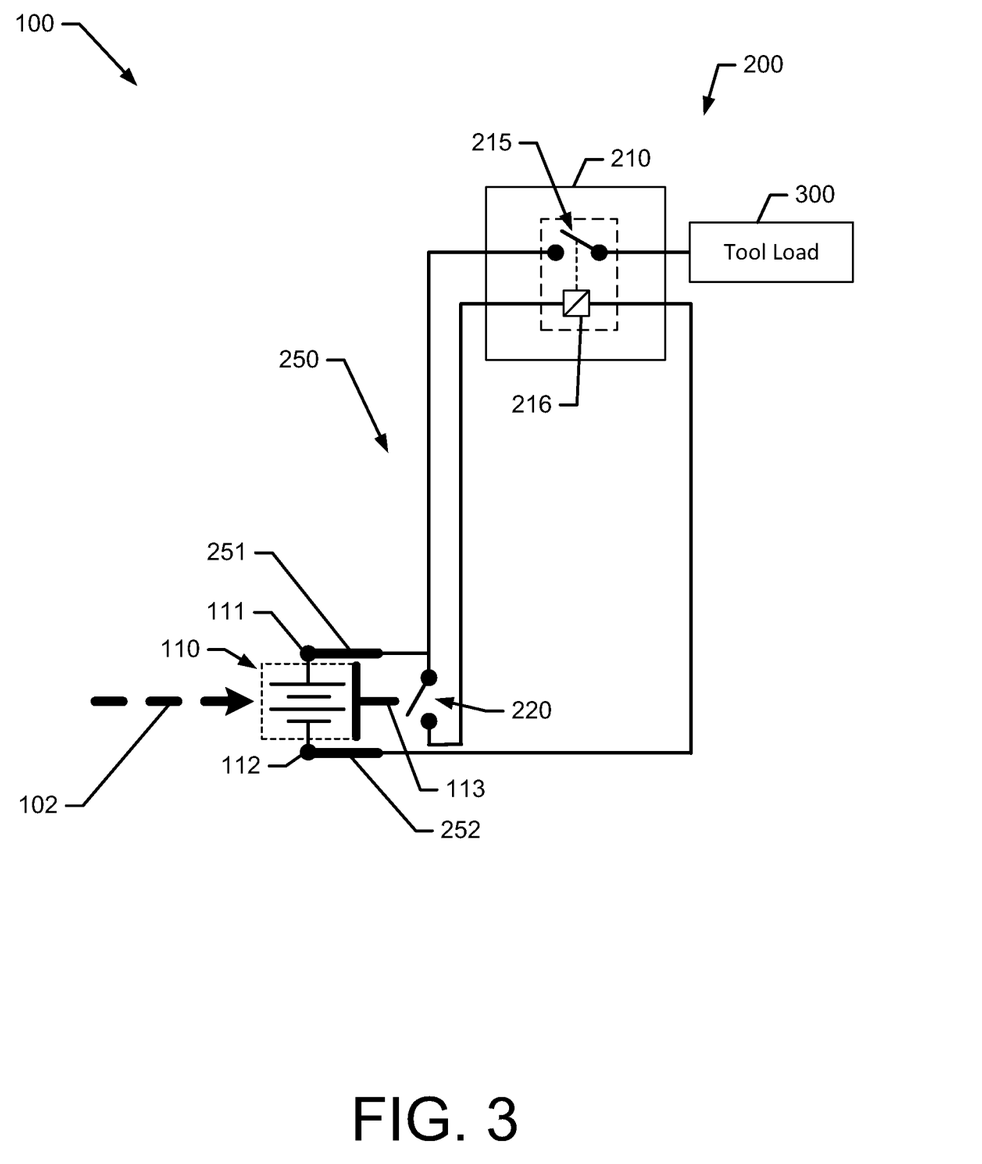
FIG. 3 shows an example functional schematic diagram of a battery connection system with a battery in a first engagement position during an installation action in accordance with an example embodiment.

FIG. 3 illustrates a first engagement position of the battery 110 relative to the battery receptacle 250 and the tool during a battery installation action. In this regard, the battery 110 has been moved in the direction of arrow 102 towards the tool-side electrical contacts 251, 252 and into electrical and physical coupling with the tool-side electrical contacts 251, 252. In other words, in this position, the battery-side electrical contacts 111, 112 are electrically and physically coupled to the tool-side electrical contacts 251, 252, however the battery detection switch engaging member 113 has not yet engaged with the battery detection switch 220. In this position, the load switch 215 remains open and therefore no current may pass from the battery 110 to the tool load 300. As such, no arcing should occur when the battery-side electrical contacts 111, 112 begin to contact the tool-side electrical contacts 251, 252 because the load switch 215 is open.

Figure 4:
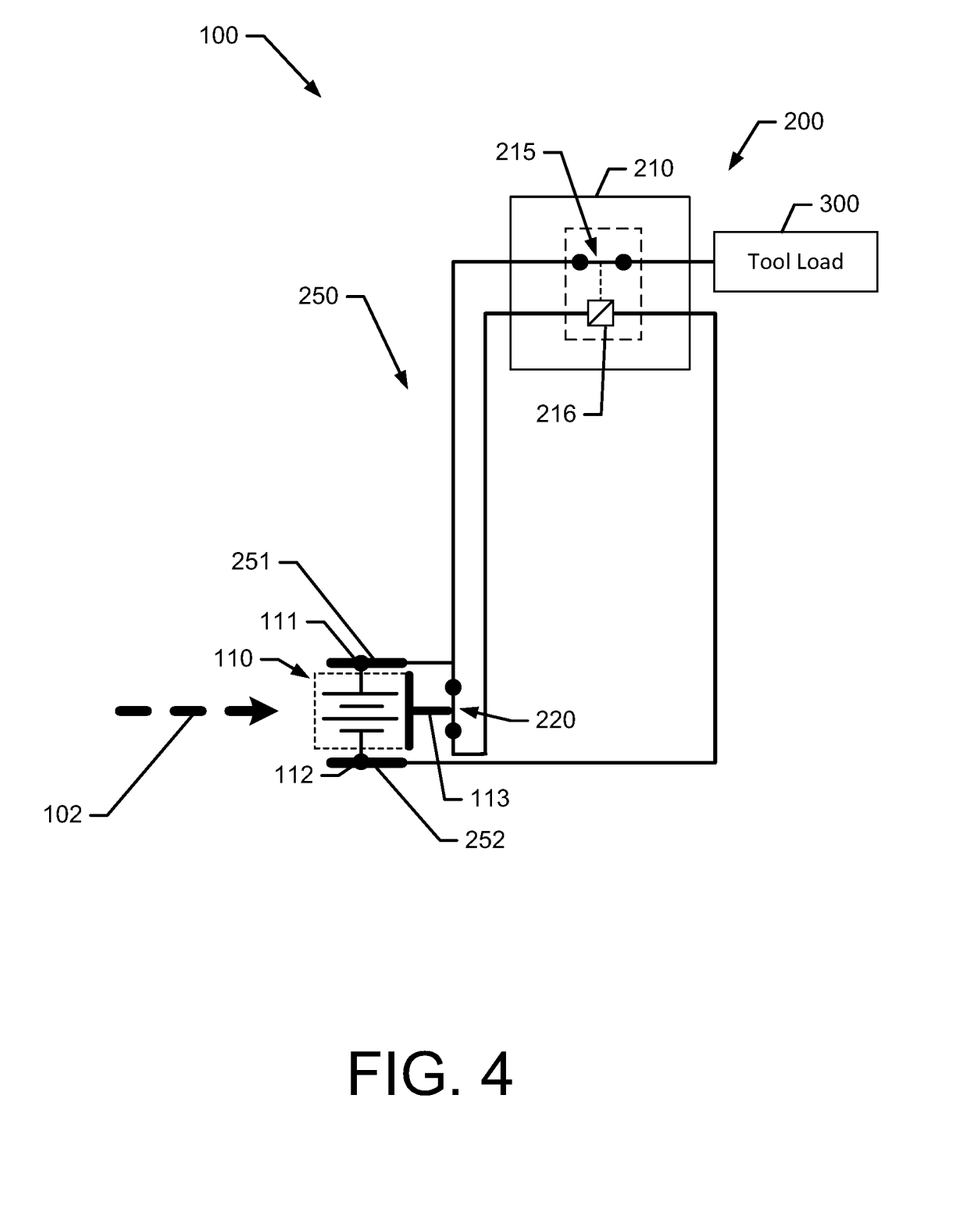
FIG. 4 shows an example functional schematic diagram of a battery connection system with a battery in a second engagement position where the battery is installed in accordance with an example embodiment.

Having assumed the first engagement position, FIG. 4 illustrates further movement of the battery 110 relative to the battery receptacle 250 and the tool into a second engagement position during a battery installation action. In this regard, the battery 110 has been moved further in the direction of arrow 102, but continues to maintain electrical and physical coupling between the battery-side electrical contacts 111, 112 and the tool-side electrical contacts 251, 252. To maintain the electrical and physical coupling, at least one of the battery-side electrical contacts 111, 112 or the tool-side electrical contacts 251, 252 may be elongated, for example, in the direction of movement of the battery 110 relative to the battery receptacle 250 and the tool 200. In other words, the battery-side electrical contacts 111, 112 and the tool-side electrical contacts 251, 252 may slide relative to each other or otherwise be movable, but maintain electrical and physical contact during the sliding movement. Further, as the battery 110 moves in the direction of arrow 102, the battery detection switch engaging member 113 of the battery 110 may begin to engage with and actuate the battery detection switch 220, ultimately causing the battery detection switch 220 to change state (e.g., close or open). Note that in the example embodiment of FIG. 4, the battery detection switch 220 is in a closed position in this second engagement position, however, different circuitry may be employed where the battery detection switch 220 moves into an open position in this situation. Because the battery detection switch 220 changes states and is now closed, switch controller 216 is powered and activated, thereby causing load switch 215 to close. Accordingly, the tool load 300 may be powered by the battery 110 because the tool load 300 is now electrically connected to the battery 110 via the closed load switch 215. Accordingly, the connectivity between the battery 110 and the tool load 300 occurs at the load switch 215, thereby avoiding any arcing that might occur at the battery-side electrical contacts 111, 112 or the tool-side electrical contacts 251, 252. Additionally, since the tool load 300 is powered, the tool 200 may be operated for its intended purpose.

Figure 5:
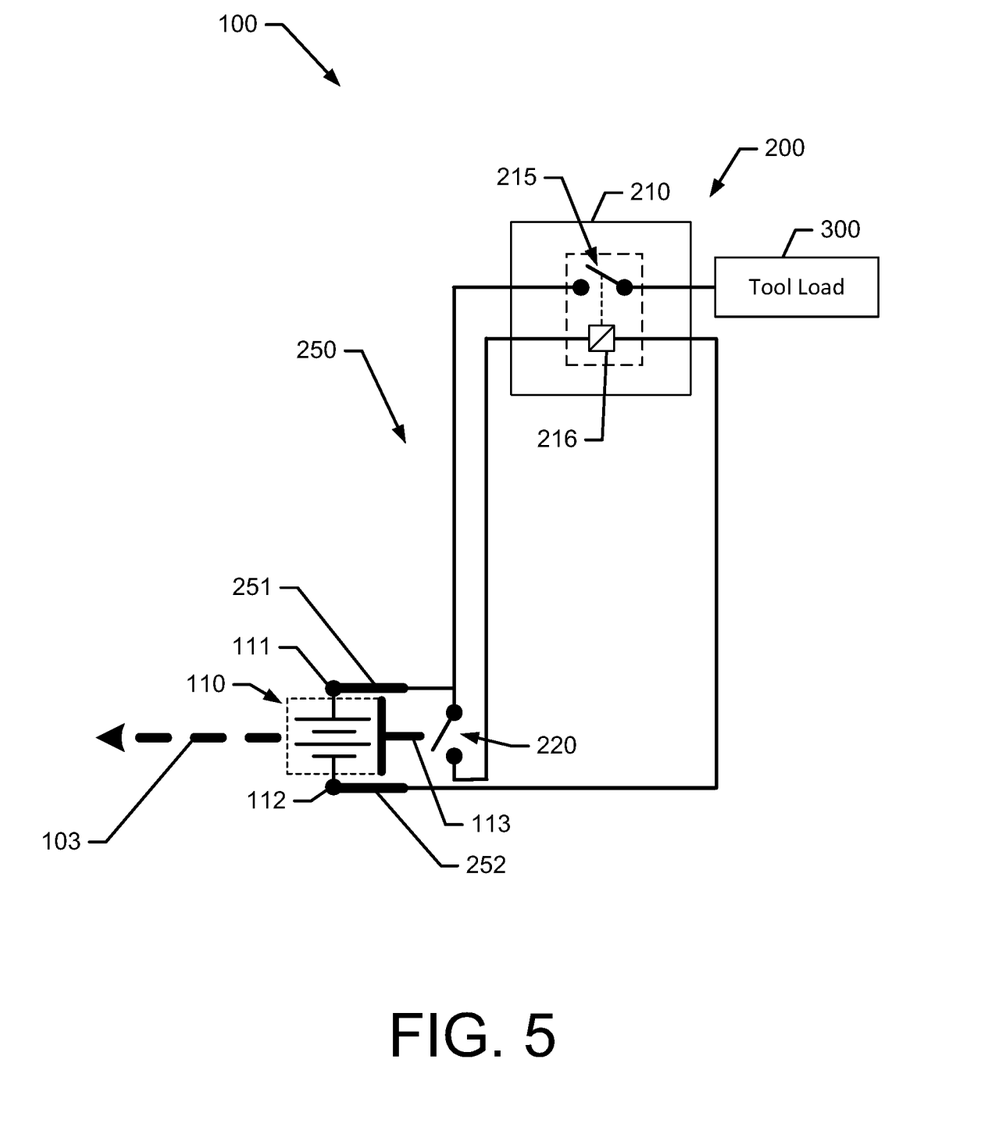
FIG. 5 shows an example functional schematic diagram of a battery connection system with a battery in the first engagement position during a removal action in accordance with an example embodiment.

Subsequently, if the battery 110 is to be removed, movement of the battery 110 relative to the battery receptacle 250 and the tool 200 may occur in the direction of arrow 103 (i.e., away from the tool) during a battery removal action as shown in FIG. 5. As such, the battery 110 and the battery receptacle 250 of the tool may revert back to the configuration associated with the first engagement position, however, during a battery removal action. In this regard, the battery 110 has been moved in the direction of arrow 103 away from the battery receptacle 250 of the tool. In this regard, although the battery 110 moves, the battery-side electrical contacts 111, 112 continue to maintain electrical and physical coupling with the tool-side electrical contacts 251, 252 as described above. However, as the battery 110 moves in the direction of arrow 103, the battery detection switch engaging member 113 of the battery 110 physically disengages from and actuates the battery detection switch 220, ultimately causing the battery detection switch 220 to change state (e.g., close or open). Note that in the example embodiment of FIG. 5, the battery detection switch 220 is in an open position in this first engagement position, however, different circuitry may be employed where the battery detection switch 220 moves into an closed position in this situation.

Because the battery detection switch engaging member 113 no longer engages with the battery detection switch 220, the switch controller 216 is no longer activated and, in response, the load switch 215 is opened. Note that the load switch 215 is opened prior to the battery-side electrical contacts 111, 112 physically and electrically decoupling from the tool-side electrical contacts 251, 252. As such, the load switch 215 breaks the circuit to the battery 110, and therefore no arcing should occur as the battery-side electrical contacts 111, 112 are decoupled from the tool-side electrical contacts 251, 252. Subsequently, the battery 110 may be fully disengaged from the battery receptacle 250 during removal, as depicted in the FIG. 2. According to some example embodiments, an example battery 600 is provided in FIGS. 6 and 7. The battery 600 may be one example of the battery 110 that may be employed in the system 100. The battery 600 may include a housing 601. According to some example embodiments, the housing 601 may be formed of, for example, molded plastic, and may enclose battery cells and battery circuitry configured to monitor and report the status of the battery 610. The battery 600 may further include a connection interface 610 that may include mechanical and electrical connection structures for physically connecting the battery 600 to a tool (e.g., tool 200, or blower 10), and for electrically connecting the battery cells within the battery 600 to electrical loads of the tool, such as, control circuitry or an electric motor. In this regard, the connection interface 610 may include battery-side engagement rails 620 and 621, and a plurality of battery-side contacts.

Figure 7:
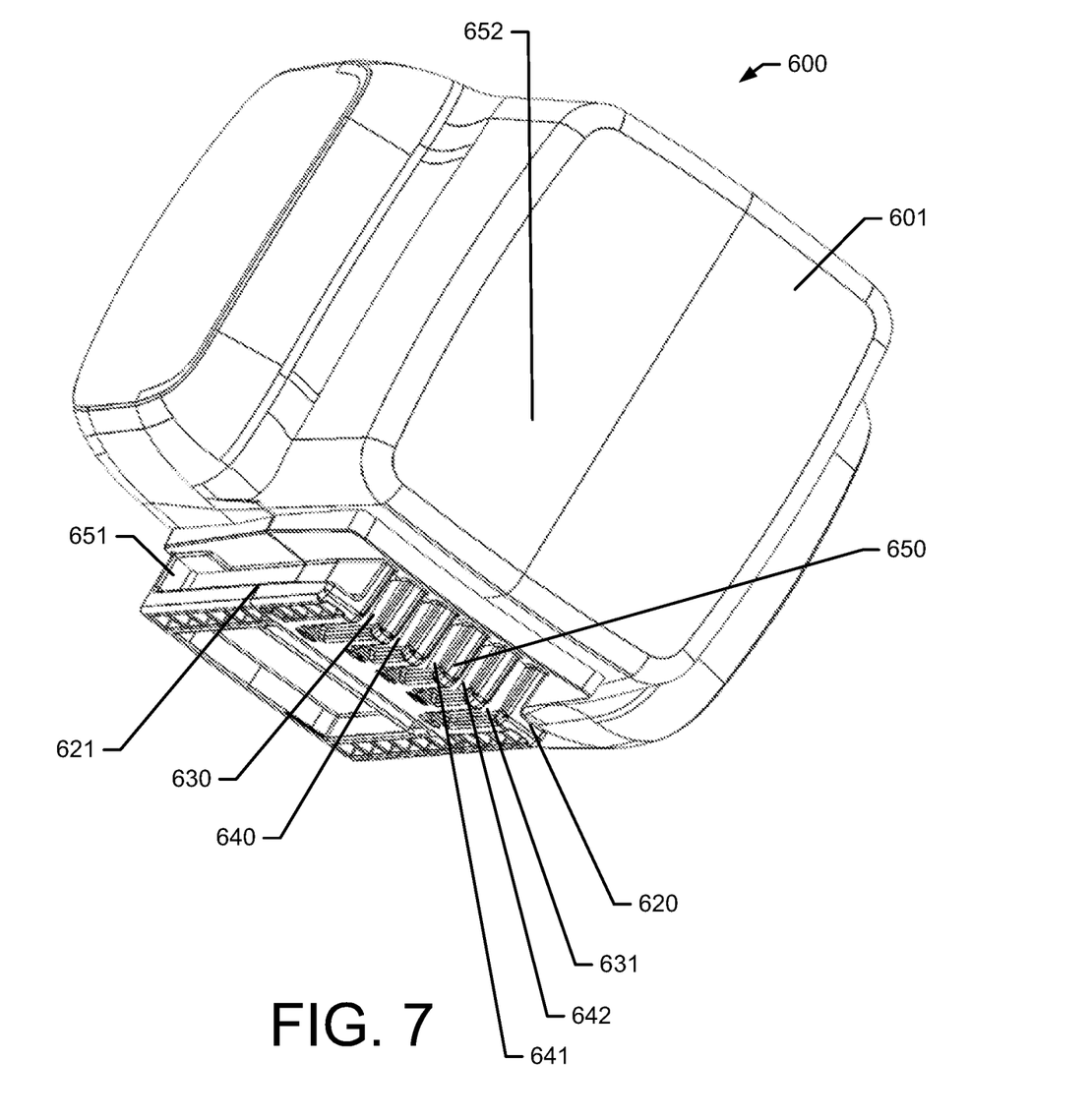

The rails 620 and 621 may run along the side walls of the connection interface 610 as best shown in FIG. 7. According to some example embodiments, the rails 620 and 621 may be formed having an L-shaped cross-section to facilitate engagement with complementary rails on the battery receptacle of a tool, such as battery receptacle 250. As such, the rails 620 and 621 may operate to guide the battery 600 into various engaging positions (e.g., first engaging position and second engaging position) during an installation action or a removal action.

Figure 6:
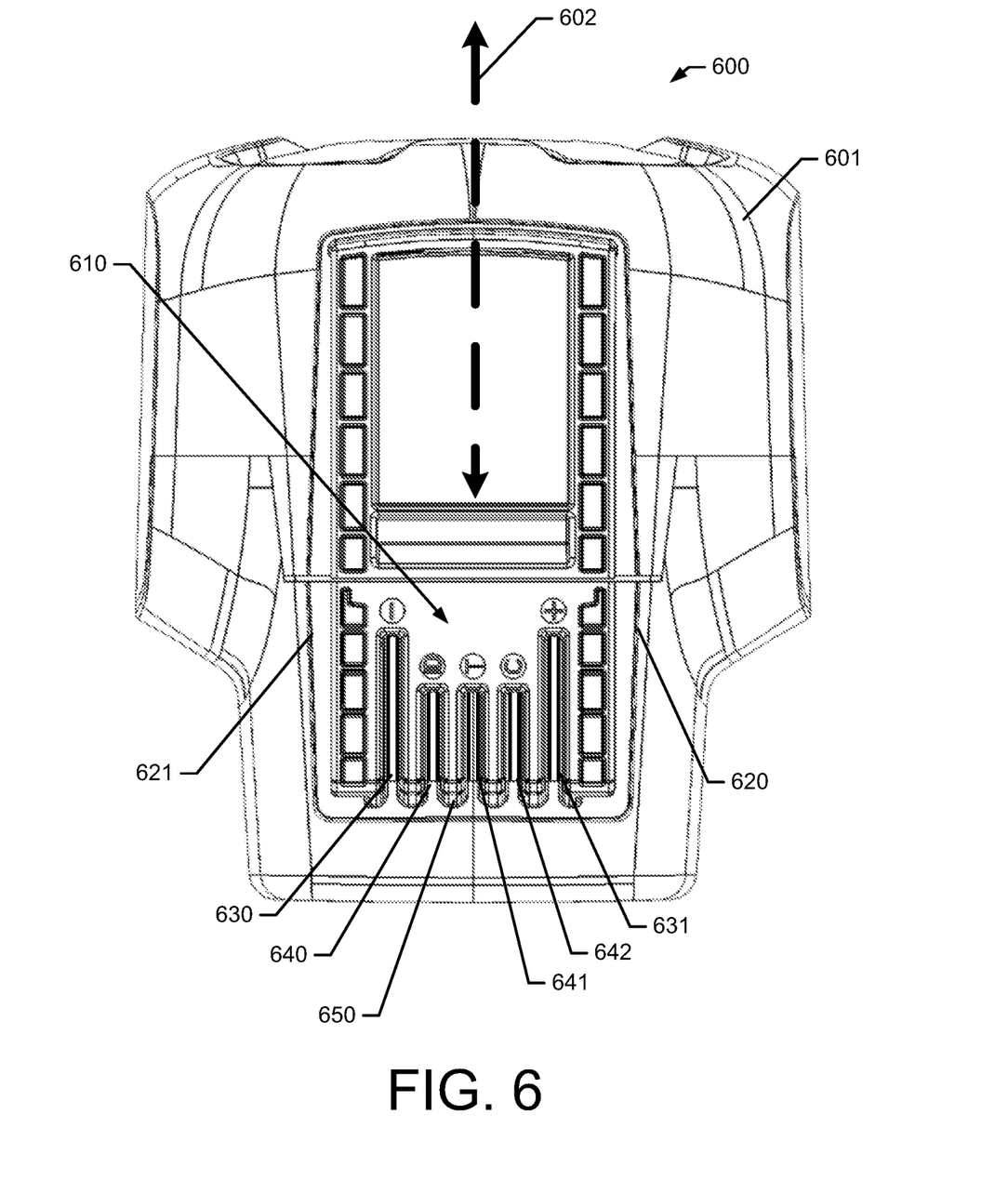
FIGS. 6 and 7 show an example battery in accordance with an example embodiment.

The contacts (i.e., battery-side electrical contacts) may include power contacts 630 and 631, which may be polarized positive or negative. The contacts on the battery-side may be formed as blade receptacles that receive a contact in the form of a blade on the battery receptacle of a tool to electrically couple to the blade on at least two sides of the blade. The contacts may also include battery status contacts 640, 641, and 642. The battery status contacts may be configured to provide information about the battery 600 to a tool when the battery 600 is installed in the tool. For example, one or more of the status contacts may provide information about temperature of the battery 600, charge level of the battery 600, or battery identification information. The contacts may be elongated and form a blade receptacle that includes side plates that are configured to slidably engage a blade-type contact of the tool that electrically and physically couples to the sides of a blade-type contact of a tool or charger. The contacts may be elongated in the direction of travel 602 of the battery 600, when the battery 600 is being installed or removed from the tool or charger. As such, a blade-type contact of the tool may initially engage with a contact of the battery 600, but the battery 600 may still be able to move relative to the tool in the direction 602 while maintaining a physical and electrical connection with the battery 601. According to some example embodiments, the rails 620 and 621 extend along a parallel plane with the elongation of the contacts 630, 631, 640, 641, and 642 so that as the battery 600 is guided into engagement positions electrical and physical coupling between the contacts 630, 631, 640, 641, and 642 and the tool-side contacts may be maintained.

With reference to FIG. 7, the battery 600 may also include a battery detection switch engaging member. The battery detection switch engaging member may be any feature of the battery 600 that may engage a switch (i.e., a battery detection switch 220). As such, according to various example embodiments, the battery detection switch engaging member may be disposed on a battery in a variety of locations that would correlate to the positioning of the battery detection switch on the tool. For example, with respect to battery 600, a protrusion 650 between the contacts of the battery 600 may be utilized as a battery detection switch engaging member. According to another example embodiment, a stop surface 651 at the rear of a channel formed by rail 621 may be utilized as a battery detection switch engaging member. Finally, according to another example embodiment, a leading side 652 of the battery 600 may operate as a battery detection switch engaging member to actuate the battery detection switch when the battery 600 is seated in a tool's battery receptacle. As one of skill in the art would appreciate, battery detection switches disposed in complementary positions on a battery receptacle of a tool would be required to facilitate use of these features as battery detection switch engaging members.

Figure 8:
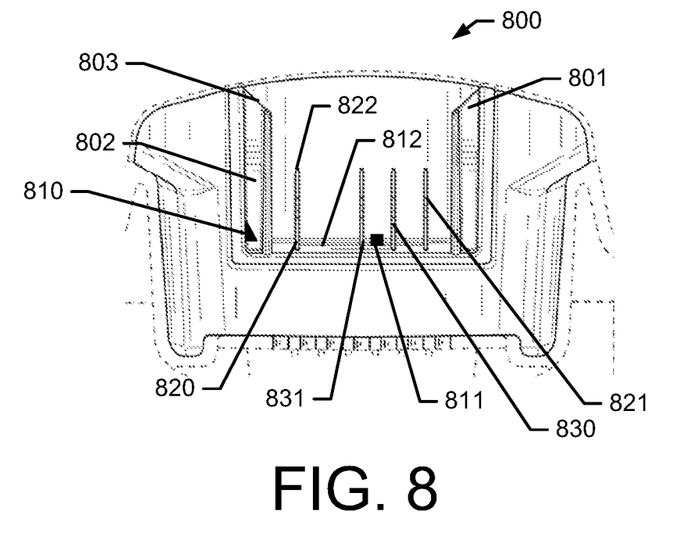
FIGS. 8 and 9 show example battery receptacles in accordance with an example embodiment.
Figure 9:
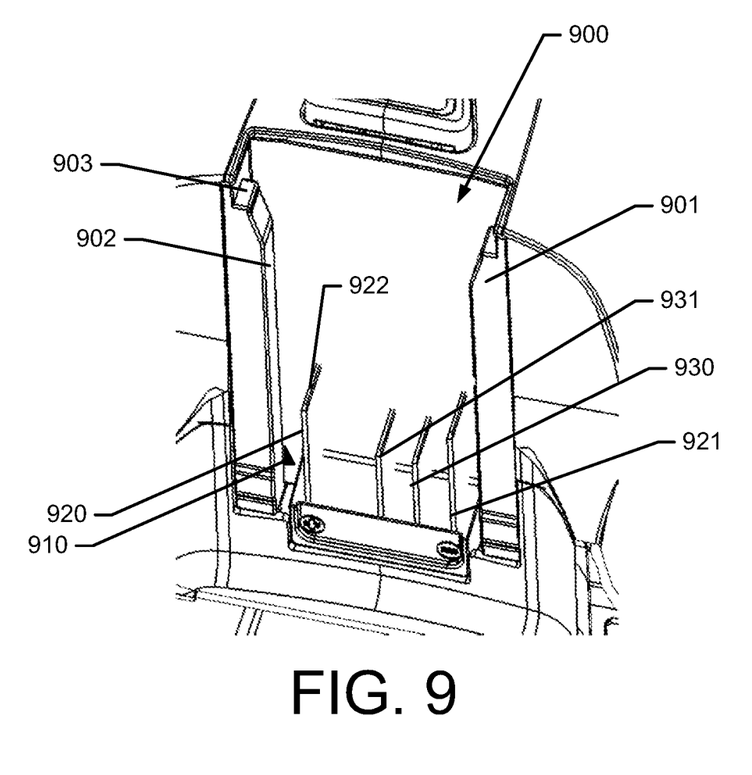

FIGS. 8 and 9 illustrate some example battery receptacles that may be disposed on an example tool, such as blower 10. In this regard, with respect to FIG. 8, the example battery receptacle 800 may include tool-side engagement rails 801 and 802. The rails 801 and 802 may be complementary to the battery rails (e.g., battery-side engagement rails 620 and 621) for receiving and guiding the movement of the battery into the battery receptacle 800. The battery receptacle 800 may further include tool-side electrical contacts 820, 821, 830, and 831. The tool-side electrical contacts 820, 821, 830, and 831 may take the form of blades that may be received into battery-side contacts that are blade receptacles. According to some example embodiments, contacts 820 and 821 may be power contacts configured to physically and electrically couple to battery-side power contacts (e.g., contacts 630 and 631). Additionally, contacts 830 and 831 may be configured to physically and electrically couple with battery status contacts of a battery (e.g., battery 600).

The battery receptacle 800 may also include a battery detection switch. According to various example embodiments, a battery detection switch may be placed in a variety of locations within the battery receptacle 800 such that the battery detection switch would be engaged by the battery and the battery's battery detection switch engaging member after electrical coupling between the contacts of the battery and the contacts of the tool has occurred during a battery installation action. In this regard, for example, a battery detection switch 810 may be disposed at a location adjacent the rail 802 and below the leading edge 822 of one of the power contacts 820 or 821. The battery detection switch 810 may be a lever or leaf switch. Alternatively, a battery detection switch 811 may be located on a base 812 of the battery receptacle 800 and, for example, disposed between two contacts. In this regard, battery detection switch 811 may be a push button switch that is engaged with a battery detection switch engaging member of a battery when the battery is seated in the base of the battery receptacle 800. Additionally, the leading edge 822 of one of the power contacts (820, 821) may be closer to a leading edge 803 of a tool-side engagement rail 802 than the battery engagement switch 810, 811.

FIG. 9 provides another example battery receptacle 900 for a tool. The example battery receptacle 900 may include tool-side engagement rails 901 and 902. The rails 901 and 902 may be complementary to the battery rails (e.g., battery-side engagement rails 620 and 621) for receiving a battery into the battery receptacle 900.

The battery receptacle 900 may further include tool-side electrical contacts 920, 921, 930, and 931. The tool-side electrical contacts 920, 921, 930, and 931 may take the form of blades that may be received into battery-side contacts that are blade receptacles. According to some example embodiments, contacts 920 and 921 may be power contacts configured to physically and electrically couple to battery-side power contacts (e.g., contacts 630 and 631). Additionally, contacts 930 and 931 may be configured to physically and electrically couple with battery status contacts of a battery (e.g., battery 600).

The battery receptacle 900 may also include a battery detection switch. According to various example embodiments, a battery detection switch may be placed in a variety of locations within the battery receptacle 900 such that the battery detection switch would be engaged by the battery after electrical coupling between the contacts of the battery and the contacts of the tool has occurred during a battery installation action. In this regard, for example, a battery detection switch 910 may be disposed at a location adjacent the rail 902 and below the leading edge 922 of one of the power contacts 920 or 921. The battery detection switch 910 may be a lever or leaf switch. Additionally, the leading edge 922 of one of the power contacts (920, 921) may be closer to a leading edge 903 of a tool-side engagement rail 902 than the battery engagement switch 910.

Figure 10:
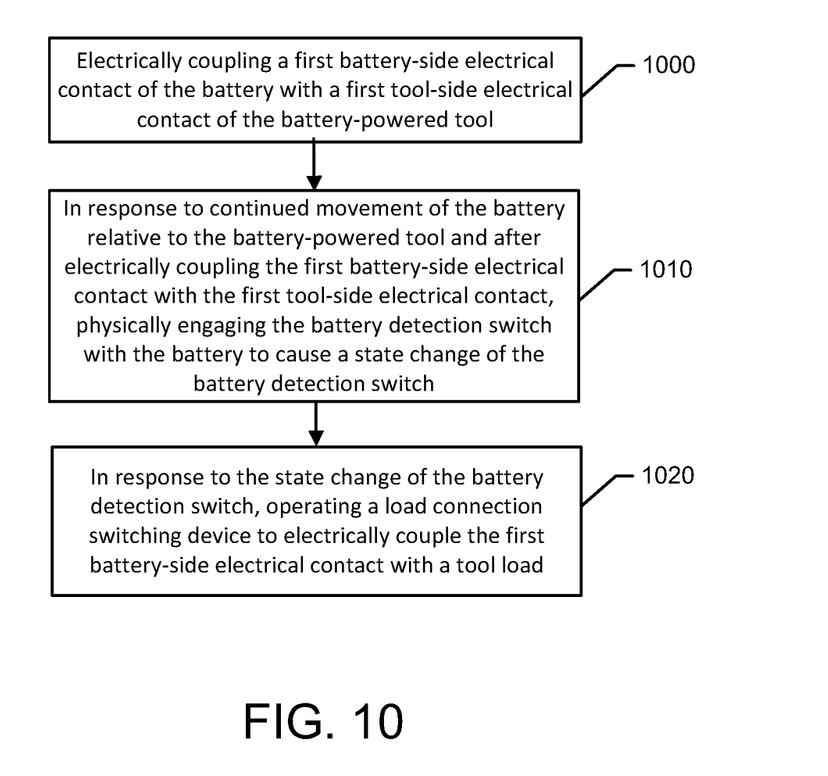
FIG. 10 shows a flowchart of an example method in accordance with an example embodiment.

FIG. 10 illustrates an example method for installing a battery in a battery-powered tool according to some example embodiments. In this regard, the example method may include, at 1000, electrically coupling a first battery-side electrical contact of the battery with a first tool-side electrical contact of the battery-powered tool. Further, at 1010, the example method may include, in response to continued movement of the battery relative to the battery-powered tool and after electrically coupling the first battery-side electrical contact with the first tool-side electrical contact, physically engaging the battery detection switch with the battery to cause a state change of the battery detection switch. Additionally, at 1020, the example method may include, in response to the state change of the battery detection switch, operating a load connection switching device to electrically couple the first battery-side electrical contact with a tool load. Additionally, according to some example embodiments, the load connection switching device may be a relay. Additionally, according to some example embodiments, the example method may further include guiding the battery to electrically couple a first battery-side electrical contact of the battery with a first tool-side electrical contact of the battery-powered tool via a tool-side engagement rail.

As described herein, a system comprising a battery and a battery-powered tool is provided. The battery-powered tool may comprise a first tool-side electrical contact, a battery detection switch, a tool load, and a load connection switching device. The load connection switching device may be configured to make an electrical connection between the first tool-side electrical contact and the tool load in response to a state change of the battery detection switch. The battery may be configured to hold an electrical charge for powering the battery-powered tool. The battery may comprise a first battery-side electrical contact, and a battery detection switch engaging member. The battery and the battery-powered tool may be configured to define engagement positions comprising a first engagement position and a second engagement position. In this regard, the battery and the battery-powered tool may be configured to be disposed in the first engagement position prior to being disposed in the second engagement position during installation of the battery with the battery-powered tool. The battery and the battery-powered tool may be further configured to be disposed in the second engagement position prior to being disposed in the first engagement position during removal of the battery from the battery-powered tool. Further, in the first engagement position, the first battery-side electrical contact is electrically coupled to the first tool-side electrical contact, and the battery detection switch is not physically engaged by the battery detection switch engaging member. In the second engagement position, the first battery-side electrical contact is electrically coupled to the tool-side electrical contact, and the battery detection switch is physically engaged with the battery detection switch engaging member to cause a state change of the battery detection switch.

The system of some example embodiments may include additional features that may be optionally added either alone or in combination with each other. For example, in some example embodiments, (1) at least one of the first tool-side electrical contact or the first battery-side electrical contact is elongated such that the first tool-side electrical contact remains electrically coupled to the first battery-side electrical contact while the battery and the battery-power tool transition between the first engagement position and the second engagement position. In some example embodiments, (2) the first tool-side electrical contact is a blade and the first battery-side electrical contact is a blade receptacle that is configured to electrically couple to the blade on at least two sides of the blade. In some example embodiments, (3) the first tool-side electrical contact is one of a plurality of tool-side electrical contacts and wherein the first battery-side electrical contact is one of a plurality of battery-side electrical contacts. In some example embodiments, (4) the battery includes a battery-side engagement rail and the battery-powered tool includes a tool-side engagement rail. In this regard, the battery-side engagement rail may physically couples with the tool-side engagement rail to guide the battery during installation to align the plurality of tool-side electrical contacts with the plurality of battery-side electrical contacts. In some example embodiments, (5) the load connection switching device is a relay. In some example embodiments, (6) the tool load includes electronics that are active when the battery-powered tool is not being operated. In some example embodiments, (7) the battery powered tool is a lawn or garden care power tool. In some example embodiments, (8) the battery is disposed in a housing, and wherein a portion of the housing is the battery engaging switch detection member. In some example embodiments, (9) the battery-powered tool comprises a tool-side engagement rail to guide the battery during installation and wherein a leading edge of the first tool-side electrical contact is closer to a leading edge of the tool-side engagement rail than the battery engagement switch. In some example embodiments, (10) the battery-powered tool comprises a tool-side engagement rail to guide the battery during installation and wherein the battery engagement switch is disposed adjacent the tool-side engagement rail. In some example embodiments, (11) the battery detection switch is a push button switch disposed at a base of a battery receptacle of the battery-powered tool. In addition, one or more of (1) to (11) above may be combined to form additional example embodiments.

Further, as described herein a battery-powered tool is provided. The battery-powered tool may comprise a first tool-side electrical contact, a battery detection switch, a tool load, and a load connection switching device. The load connection switching device may be configured to make an electrical connection between the first tool-side electrical contact and the tool load in response to a state change of battery detection switch. The battery and the battery-powered tool may be configured to define engagement positions comprising a first engagement position and a second engagement position. In this regard, the battery and the battery-powered tool may be configured to be disposed in the first engagement position prior to being disposed in the second engagement position during installation of the battery with the battery-powered tool. The battery and the battery-powered tool may be further configured to be disposed in the second engagement position prior to being disposed in the first engagement position during removal of the battery from the battery-powered tool. In the first engagement position, a first battery-side electrical contact is electrically coupled to a first tool-side electrical contact, and the battery detection switch is not physically engaged by the battery. In the second engagement position, the first battery-side electrical contact is electrically coupled to the tool-side electrical contact, and the battery detection switch is physically engaged with the battery to cause a state change of the battery detection switch.

The battery-powered tool of some example embodiments may include additional features that may be optionally added either alone or in combination with each other. For example, in some example embodiments, (1) the first tool-side electrical contact is elongated such that the first tool-side electrical contact remains electrically coupled to the first battery-side electrical contact while transitioning between the first engagement position and the second engagement position. In some example embodiments, (2) the load connection switching device is a relay. In some example embodiments, (3) the battery-powered tool further comprises a tool-side engagement rail to guide the battery during installation and wherein the battery engagement switch is disposed adjacent the tool-side engagement rail. In some example embodiments, (4) the battery-powered tool may further comprising a tool-side engagement rail to guide the battery during installation and wherein a leading edge of the first tool-side electrical contact is closer to a leading edge of the tool-side engagement rail than the battery engagement switch. In addition, one or more of (1) to (4) above may be combined to form additional example embodiments.

Additionally, as described herein an example method for installing a battery in a battery-powered tool is provided. The example method may comprise electrically coupling a first battery-side electrical contact of the battery with a first tool-side electrical contact of the battery-powered tool. The example method may further comprise, in response to continued movement of the battery relative to the battery-powered tool and after electrically coupling the first battery-side electrical contact with the first tool-side electrical contact, physically engaging the battery detection switch with the battery to cause a state change of the battery detection switch. The example method may further comprise, in response to the state change of the battery detection switch, operating a load connection switching device to electrically couple the first battery-side electrical contact with a tool load.

The example method of some example embodiments may include additional features that may be optionally added either alone or in combination with each other. For example, in some example embodiments, (1) the load connection switching device is a relay. In some example embodiments, the example method may further comprise (2) guiding the battery to electrically coupling a first battery-side electrical contact of the battery with a first tool-side electrical contact of the battery-powered tool via a tool-side engagement rail. In addition, one or more of (1) and (2) above may be combined to form additional example embodiments.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A system comprising:
   a battery-powered tool, the battery-powered tool comprising:
   a first tool-side electrical contact;
   a battery detection switch;
   a tool load; and
   a load connection switching device configured to make an electrical connection between the first tool-side electrical contact and the tool load in response to a state change of the battery detection switch; and
   a battery configured to hold an electrical charge for powering the battery-powered tool, the battery comprising:
   a first battery-side electrical contact; and
   a battery detection switch engaging member;
   wherein the battery and the battery-powered tool define engagement positions comprising a first engagement position and a second engagement position;
   wherein the battery and the battery-powered tool are configured to be disposed in the first engagement position prior to being disposed in the second engagement position during installation of the battery with the battery-powered tool, and the battery and the battery-powered tool are configured to be disposed in the second engagement position prior to being disposed in the first engagement position during removal of the battery from the battery-powered tool;
   wherein, in the first engagement position, the first battery-side electrical contact is electrically coupled to the first tool-side electrical contact, and the battery detection switch is not physically engaged by the battery detection switch engaging member; and
   wherein, in the second engagement position, the first battery-side electrical contact is electrically coupled to the tool-side electrical contact, and the battery detection switch is physically engaged with the battery detection switch engaging member to cause a state change of the battery detection switch.

2. The system of claim 1, wherein at least one of the first tool-side electrical contact or the first battery-side electrical contact is elongated such that the first tool-side electrical contact remains electrically coupled to the first battery-side electrical contact while the battery and the battery-power tool transition between the first engagement position and the second engagement position.

3. The system of claim 1, wherein the first tool-side electrical contact is a blade and the first battery-side electrical contact is a blade receptacle that is configured to electrically couple to the blade on at least two sides of the blade.

4. The system of claim 1, wherein the first tool-side electrical contact is one of a plurality of tool-side electrical contacts and wherein the first battery-side electrical contact is one of a plurality of battery-side electrical contacts.

5. The system of claim 4, wherein the battery includes a battery-side engagement rail and the battery-powered tool includes a tool-side engagement rail, wherein the battery-side engagement rail physically couples with the tool-side engagement rail to guide the battery during installation to align the plurality of tool-side electrical contacts with the plurality of battery-side electrical contacts.

6. The system of claim 1, wherein the load connection switching device is a relay.

7. The system of claim 1, wherein the tool load includes electronics that are active when the battery-powered tool is not being operated.

8. The system of claim 1, wherein the battery-powered tool is a lawn or garden care power tool.

9. The system of claim 1, wherein the battery is disposed in a housing, and wherein a portion of the housing is the battery engaging switch detection member.

10. The system of claim 1, wherein the battery-powered tool comprises a tool-side engagement rail to guide the battery during installation and wherein a leading edge of the first tool-side electrical contact is closer to a leading edge of the tool-side engagement rail than the battery engagement switch.

11. The system of claim 1, wherein the battery-powered tool comprises a tool-side engagement rail to guide the battery during installation and wherein the battery engagement switch is disposed adjacent the tool-side engagement rail.

12. The system of claim 1, wherein the battery detection switch is a push button switch disposed at a base of a battery receptacle of the battery-powered tool.

* * * * *